US009680617B2

(12) United States Patent
Wei

(10) Patent No.: US 9,680,617 B2
(45) Date of Patent: Jun. 13, 2017

(54) METHOD OF TRANSMITTING REFERENCE SIGNAL IN UNLICENSED SPECTRUM FOR LTE-LAA SYSTEM AND WIRELESS DEVICE USING THE SAME

(71) Applicant: Acer Incorporated, New Taipei (TW)

(72) Inventor: Hung-Yu Wei, New Taipei (TW)

(73) Assignee: Acer Incorporated, New Taipei (TW)

( * ) Notice: Subject to any disclaimer, the term of this patent is extended or adjusted under 35 U.S.C. 154(b) by 56 days.

(21) Appl. No.: 14/919,739

(22) Filed: Oct. 22, 2015

(65) Prior Publication Data

US 2016/0277165 A1   Sep. 22, 2016

Related U.S. Application Data

(60) Provisional application No. 62/135,708, filed on Mar. 20, 2015.

(51) Int. Cl.
*H04W 28/04* (2009.01)
*H04L 5/00* (2006.01)
*H04L 27/00* (2006.01)

(52) U.S. Cl.
CPC .......... *H04L 5/0048* (2013.01); *H04L 5/0007* (2013.01); *H04L 27/0006* (2013.01); *H04L 5/0001* (2013.01)

(58) Field of Classification Search
CPC .... H04L 5/0001; H04L 5/0048; H04W 72/00; H04W 72/04; H04W 72/042;

(Continued)

(56) References Cited

U.S. PATENT DOCUMENTS

2008/0107095 A1* 5/2008 Black .............. H04W 16/14
370/342
2011/0228732 A1 9/2011 Luo et al.
(Continued)

FOREIGN PATENT DOCUMENTS

CN    103580840    2/2014

OTHER PUBLICATIONS

Ericsson et al., "Study on Licensed-Assisted Access using LTE," 3GPP RAN Plenary contribution, RP-141664, Sep. 9-12, 2014, pp. 1-8.

*Primary Examiner* — Mohamed Kamara
(74) *Attorney, Agent, or Firm* — Jianq Chyun IP Office

(57) ABSTRACT

The disclosure is directed to method of transmitting a reference signal used by a wireless device in an unlicensed spectrum for a LTE-LAA communication system, and a wireless communication device using the same method. In one of the exemplary embodiments, the method would include not limited to receiving, via a first wireless receiver tuned to a licensed spectrum, a control message which at least indicates a pattern of a reference signal to be received; receiving, via a second wireless receiver tuned to an unlicensed spectrum, a first message which comprises the reference signal in the unlicensed spectrum; performing a measurement of the reference signal; generating a feedback based on the measurement of the reference signal; and transmitting, via a wireless transmitter tuned to the licensed spectrum, a second message which comprises the feedback of the reference signal in the licensed spectrum.

20 Claims, 8 Drawing Sheets

(58) Field of Classification Search
CPC ......... H04W 72/0426; H04W 72/0433; H04W 72/044; H04W 72/0453; H04W 72/12; H04W 28/044; H04W 28/046; H04W 16/00; H04W 16/10; H04W 16/06; H04W 16/14; H04W 16/225; H04W 84/10; H04W 84/12; H04W 24/10
See application file for complete search history.

(56) References Cited

U.S. PATENT DOCUMENTS

| | | | |
|---|---|---|---|
| 2012/0033645 A1* | 2/2012 | Mantravadi | H04W 72/1215 370/336 |
| 2012/0207040 A1* | 8/2012 | Comsa | H04W 72/1215 370/252 |
| 2012/0250631 A1 | 10/2012 | Hakola et al. | |
| 2013/0088983 A1* | 4/2013 | Pragada | H04W 16/14 370/252 |
| 2013/0176981 A1 | 7/2013 | Earnshaw et al. | |
| 2013/0324172 A1* | 12/2013 | Ahn | H04W 36/0094 455/501 |
| 2015/0181453 A1* | 6/2015 | Chen | H04L 1/0026 370/252 |
| 2016/0057186 A1* | 2/2016 | Jose | H04L 45/02 370/312 |

* cited by examiner

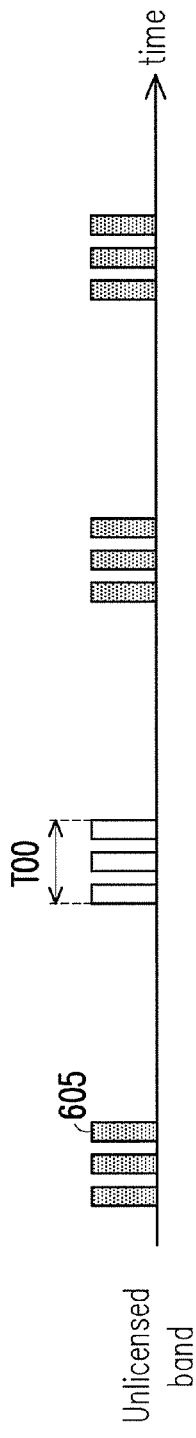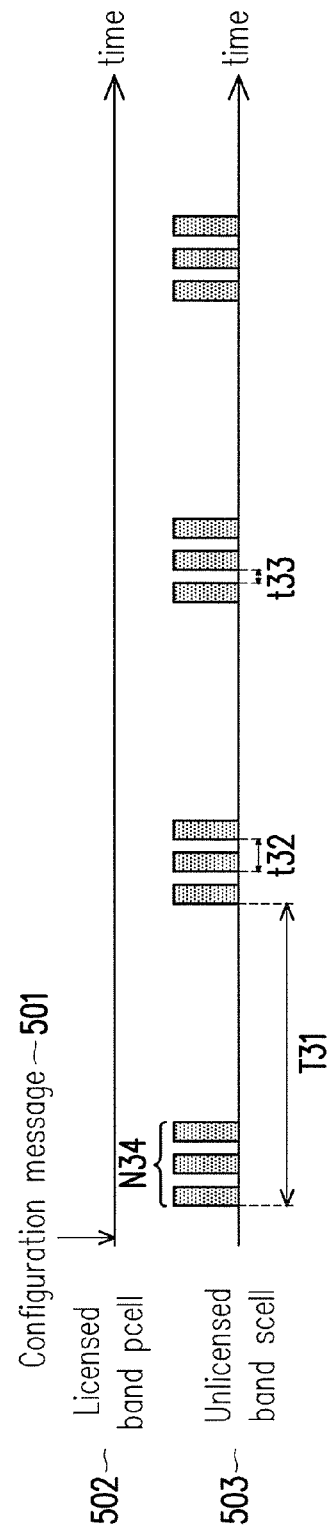

METHOD OF TRANSMITTING REFERENCE SIGNAL IN UNLICENSED SPECTRUM FOR LTE-LAA SYSTEM AND WIRELESS DEVICE USING THE SAME

CROSS REFERENCE TO RELATED APPLICATION

This application claims the priority benefit of U.S. provisional application Ser. No. 62/135,708, filed on Mar. 20, 2015. The entirety of the above-mentioned patent application is hereby incorporated by reference herein and made a part of specification.

TECHNICAL FIELD

The present disclosure is directed to a method of transmitting a reference signal used by a wireless device in an unlicensed spectrum for a Long Term Evolution (LTE)-Licensed Assisted Access (LAA) communication system, and a wireless communication device using the same method.

BACKGROUND

Conventionally, a wireless communication system operates in a proprietary radio frequency (RF) spectrum in which base stations and wireless terminals communicate through the proprietary RF spectrum licensed to a wireless operator. However, there has been discussions of wireless communication systems expanding usages to unlicensed spectrum, such as the Industrial, Scientific and Medical RF spectrum (ISM band) or other free spectrum. The possibilities of Long Term Evolution (LTE) or LTE-advanced communication systems making incursions into the unlicensed spectrums have drawn attention for telecommunication equipment vendors and operators. One reason for such interest is the potential overcrowding of licensed spectrums. In order to provide high throughput services to more users, incursions into unlicensed spectrums might alleviate overcrowding of for wireless communication systems.

In 2014 September, a new study item, namely "*Study on Licensed-Assisted Access using LTE*" was approved for investigations related to 3GPP Release 13. The framework for Licensed-Assisted Access (LAA) to unlicensed spectrum has also been known as Unlicensed LTE (LTE-U), which may potentially be a key feature for the next generation cellular system.

One of the challenges is to operate a cellular system in an environment of uncertainty and to consider co-existing issues. As the communications is conducted in unlicensed or shared spectrum, there might be other communications devices that, either using the same radio access technology or different radio access technology, would like to use the same unlicensed spectrum. For example, unlicensed LTE operations might need to co-exist with Wi-Fi radios which operates in an unlicensed spectrum and is not under the direct control of the LTE operations.

Since the unlicensed band is shared by other radio access technology such as Wi-Fi or by another LTE-U transmitter, the planned transmission could be delayed or might not actually be transmitted because of on-going transmissions in the unlicensed band.

One conventional method of transmitting reference signals is that a base station transmits reference signals 101 periodically, as shown in FIG. 1. If the reference signals 101 are transmitted periodically in the licensed spectrum, the reference signals could be received by tuning to a specific frequency spectrum. In an LTE-U operation however, in some occasions reference signals might not be transmitted because the unlicensed spectrum is occupied as one or more other radio transceivers might be using the available unlicensed spectrum at that moment.

Therefore, providing solutions for transmitting reference signals for LTE-U operation would be required.

SUMMARY OF THE DISCLOSURE

Accordingly, the present disclosure is directed to method of transmitting a reference signal used by a wireless device in an unlicensed spectrum for a Long Term Evolution (LTE)-Licensed Assisted Access (LAA) communication system, and a wireless communication device using the same method.

In one of the exemplary embodiments, the present disclosure is directed to a method of transmitting a reference signal used by a wireless device in an unlicensed spectrum for a LTE-LAA communication system, the method would include not limited to receiving, via a first wireless receiver tuned to a licensed spectrum, a control message which at least indicates a pattern of a reference signal to be received; receiving, via a second wireless receiver tuned to an unlicensed spectrum, a first message which comprises the reference signal in the unlicensed spectrum; performing a measurement of the reference signal; generating a feedback based on the measurement of the reference signal; and transmitting, via a wireless transmitter tuned to the licensed spectrum, a second message which comprises the feedback of the reference signal in the licensed spectrum.

In one of the exemplary embodiment, the present disclosure is directed to a wireless device which includes not limited to a first wireless receiver tuned to a licensed spectrum; a second wireless receiver tuned to an licensed spectrum; a wireless transmitter tuned to the licensed spectrum; and a processor coupled to the first wireless receiver, the second wireless receiver, and the wireless transmitter. The processor is configured at least for: receiving, via a first wireless receiver tuned to a licensed spectrum, a control message which at least indicates a pattern of a reference signal to be received; receiving, via a second wireless receiver tuned to an unlicensed spectrum, a first message which comprises the reference signal in the unlicensed spectrum; performing a measurement of the reference signal; generating a feedback based on the measurement of the reference signal; and transmitting, via a wireless transmitter tuned to the licensed spectrum, a second message which comprises the feedback of the reference signal in the licensed spectrum.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 4 illustrates transmitting a reference signal used by a wireless device in an unlicensed spectrum for a LTE-LAA communication system in accordance with one of the exemplary embodiments of the disclosure.

FIG. 5 illustrates transmitting a configuration message to configure a transmission of a reference signal used by a wireless device in an unlicensed spectrum for a LTE-LAA communication system in accordance with one of the exemplary embodiments of the disclosure.

DETAILED DESCRIPTION OF DISCLOSED EMBODIMENTS

Figure 1A:
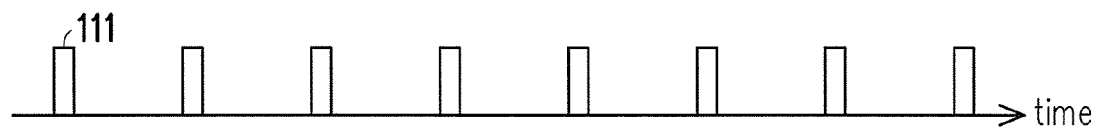
FIG. 1A illustrates a conventional method of transmitting reference signals in a wireless communication system.

Reference will now be made in detail to the present exemplary embodiments of the disclosure, examples of which are illustrated in the accompanying drawings. Wherever possible, the same reference numbers are used in the drawings and the description to refer to the same or like parts. In the following descriptions, LTE-U and LAA might be used interchangeably.

Figure 1B:
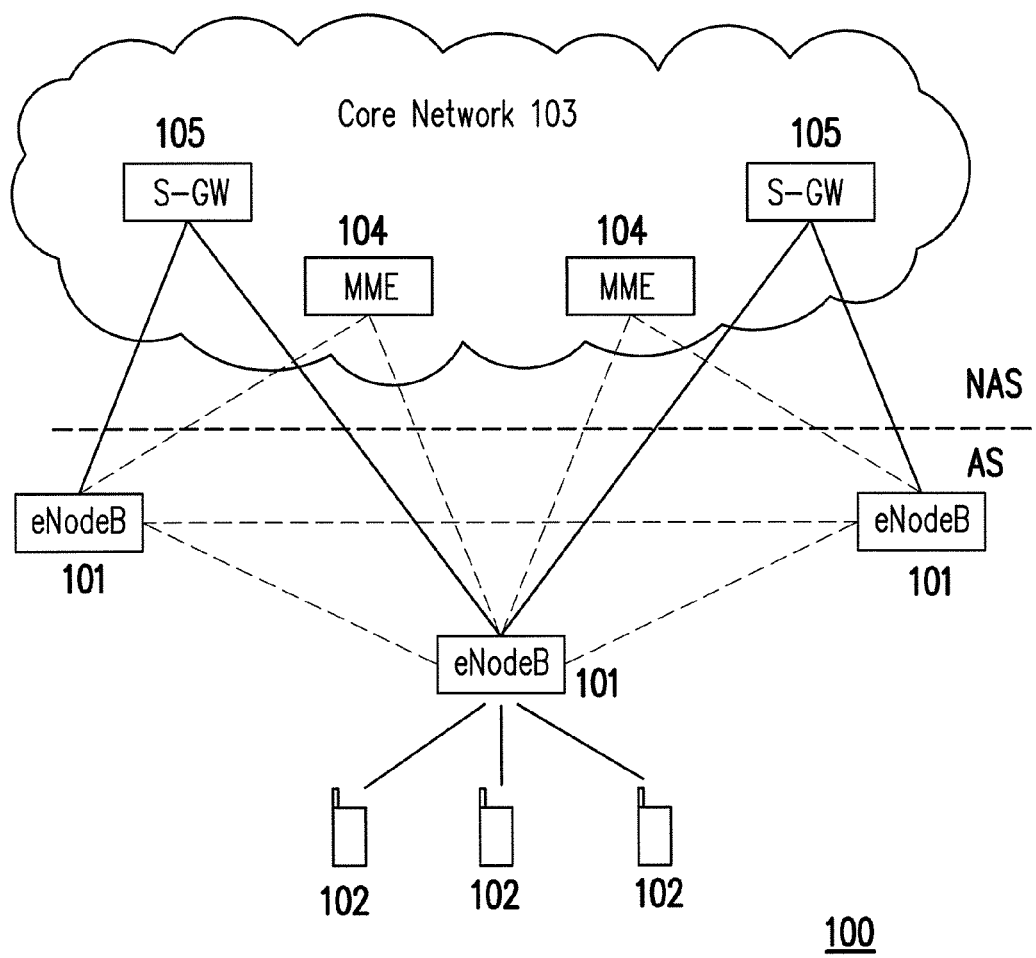
FIG. 1B illustrates a typical LTE network in which the proposed method of transmitting reference signals in a wireless communication system could be utilized.

FIG. 1B illustrates a typical LTE wireless communication system in which the proposed method of transmitting a reference signal could be utilized. The LTE wireless communication system may include a radio access network (RAN) known as an evolved UTRAN (E-UTRAN). The radio access network may include one or multiple base stations or evolved Node-B (eNB) 101 for communicating with one or more user equipment (UEs) 102. The E-UTRAN may communicate with a core network 103 that includes a mobility management entity (MME) 104, a serving gateway (S-GW) 105, and etc., for Non Access Stratum (NAS) control.

The term "user equipment" (UE) such as UEs 102 in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

The term "base station" (BS) such as the BS 101 in this disclosure could represent various embodiments which for example could include but not limited to a Home Evolved Node B (HeNB), an eNB, an advanced base station (ABS), a base transceiver system (BTS), an access point, a home base station, a relay station, a scatterer, a repeater, an intermediate node, an intermediary, and/or satellite-based communications base stations.

Figure 2:
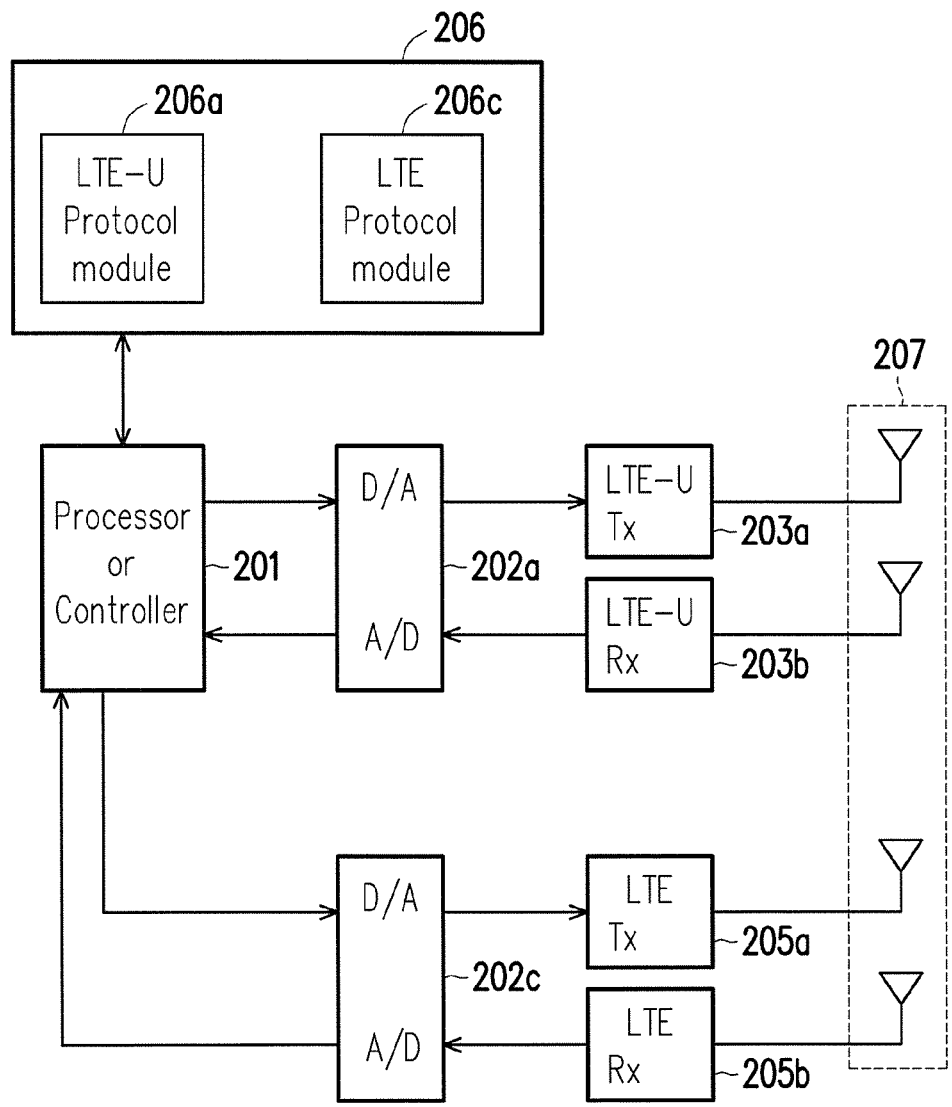
FIG. 2 illustrates a hardware diagram of a wireless communication device that uses the proposed method of transmitting a reference signal used by a wireless device in an unlicensed spectrum for a LTE-LAA communication system in accordance with one of the exemplary embodiments of the disclosure.

From the hardware perspective, a wireless device such as the BS and the UE may be represented by at least the functional elements as illustrated in FIG. 2 in accordance with an embodiment of the present disclosure. Referring to FIG. 2, the wireless device 200 would include at least but not limited to a processor and/or a controller 201 (hereinafter referred to as "processor 201"), one or more digital-to-analog (D/A)/analog-to-digital (A/D) converters 202a-202c, optionally a LTE-U transmitter (TX) 203a and a LTE-U receiver (RX) 203b, a Wi-Fi TX 204a and a Wi-Fi RX 204b, a LTE TX 205a and a LTE RX 205b, a memory module 206, and antennas 207.

The processor 201 is configured to process digital signal and to implement the proposed method of transmitting a reference signal in an unlicensed spectrum as described in the disclosure. Also, the processor 201 may be coupled to a memory module 206 to store software programs such as a LTE-U protocol module 206a, a Wi-Fi protocol module 206b, and a LTE protocol module 206c, programming codes, device configurations, a codebook, buffered or permanent data, and so forth. The processor 201 is configured to access and execute the modules recorded in the memory module 206. The functions of the processor 201 could be implemented by using programmable units such as a microprocessor, a micro-controller, digital signal processor (DSP) chips, a field-programmable gate array (FPGA), etc. The functions of the processor 201 may also be implemented with separate electronic devices or ICs, and functions performed by the processor 201 may also be implemented within the domains of either hardware or software.

The LTE-U protocol module 206a would support LTE-U protocol. That means the processor 201 executed the LTE-U protocol module 206a would convert a digital message into a format that is compatible with LTE-U protocol, and could access the cellular network such as Evolved Universal Terrestrial Radio Access Network (E-UTRAN). The Wi-Fi protocol module 206b would support 802.11 (or Wi-Fi) protocol. That means the processor 201 executed the Wi-Fi protocol module 206b would convert a digital message into a format that is compatible with Wi-Fi protocol according to the IEEE 802.11 standard or similar standards such as IEEE 802.11x, and could access the wireless local access network (WLAN). The LTE protocol module 206c would support LTE protocol. That means the processor 201 executed the LTE protocol module 206c would convert a digital message into a format that is compatible with LTE protocol, and could access the cellular network such as E-UTRAN. Notice that the LTE protocol module 206c may be optionally combined with 3G and/or 2G protocol module.

In addition, the processor 201 of the BS may be used to coordinate different RATs. For example, the processor 201 of the BS may coordinate two or more RATs such as radio operations of Wi-Fi and LTE-U using the same unlicensed spectrum. The processor 201 of the BS may coordinate radio technologies such as radio operation LTE using licensed spectrum and unlicensed spectrum. A UE may communicate with a BS using both licensed spectrum and unlicensed spectrum.

It should be noticed that the BS may operate as a combination of at least two devices. One device such as an eNB is used for handling the LTE and LTE-U operations, and another device such as a Wi-Fi AP for handling the Wi-Fi operation.

The two devices could be two different co-located devices or could be separate devices in near proximity of each other and may each may have its own processor or controller, and have an inter-base station interface between the two devices for exchanging control signals between the LTE and LTE-U operations and the Wi-Fi operation. The inter-base station interface may be for example but not limited to cable, fiber, or radio interface. For example, a control signal may be used for configuring operations in the unlicensed spectrum.

In another embodiment, the BS may operate as a traditional BS but with LTE-U capability. The processor 201 of the BS may be used for handling all LTE, LTE-U, and Wi-Fi operations, and include an inter-base station interface for exchanging control signals of a coordinating configuration between each two protocol modules of the LTE-U protocol module 206a, the Wi-Fi protocol module 206b, and the LTE protocol module 206c. The inter-base station interface may be a physical or virtual line established by cable or software.

The D/A/A/D converters 202a-202c is configured to convert from an analog signal format to a digital signal format during uplink signal processing and from a digital signal format to an analog signal format during downlink signal processing.

The LTE-U TX 203a and the LTE-U RX 203b operated at an unlicensed spectrum such as 5 GHz, 2.4 GHz, other Industrial, Scientific and Medical (ISM) radio bands, or Unlicensed National Information Infrastructure (U-NII) band are respectively used for transmitting and receiving modulated signals which could be wireless RF signals (through one or more antennas 207) for LTE-U protocol module 206a. The Wi-Fi TX 204a and the Wi-Fi RX 204b operated at the unlicensed spectrum are respectively used for transmitting and receiving modulated signals which could be wireless RF signals (through one or more antennas 207) for Wi-Fi protocol module 206b. The unlicensed spectrum operated by the LTE-U TX 203a, the LTE-U RX 203b, Wi-Fi TX 204a, and the Wi-Fi RX 204b may be the same or different. In addition, the LTE-U TX 203a, the LTE-U RX 203b, Wi-Fi TX 204a, and the Wi-Fi RX 204b may be used for sensing the transmission (of other devices such as Wi-FI devices 102a-102c and LTE-U devices 103a-103c) in the unlicensed spectrum. The LTE TX 205a and the LTE RX 205b operated at a licensed spectrum such as frequency bands 700, 850, 1800, 1900, 2100, and etc are respectively used for transmitting and receiving modulated signals which could be wireless RF signals (through one or more antennas 207) for LTE protocol module 206c. The LTE-U TX 203a and the LTE-U RX 203b, the Wi-Fi TX 204a and the Wi-Fi RX 204b, and the LTE TX 205a and the LTE RX 205b may also perform operations such as low noise amplifying, impedance matching, frequency mixing, up or down frequency conversion, filtering, amplifying, and so like.

The memory module 206 may be a fixed or a movable device in any possible forms including non-transitory computer readable recording medium such as a random access memory (RAM), a read-only memory (ROM), a flash memory or other similar devices, or a combination of the above-mentioned devices.

Figure 3:
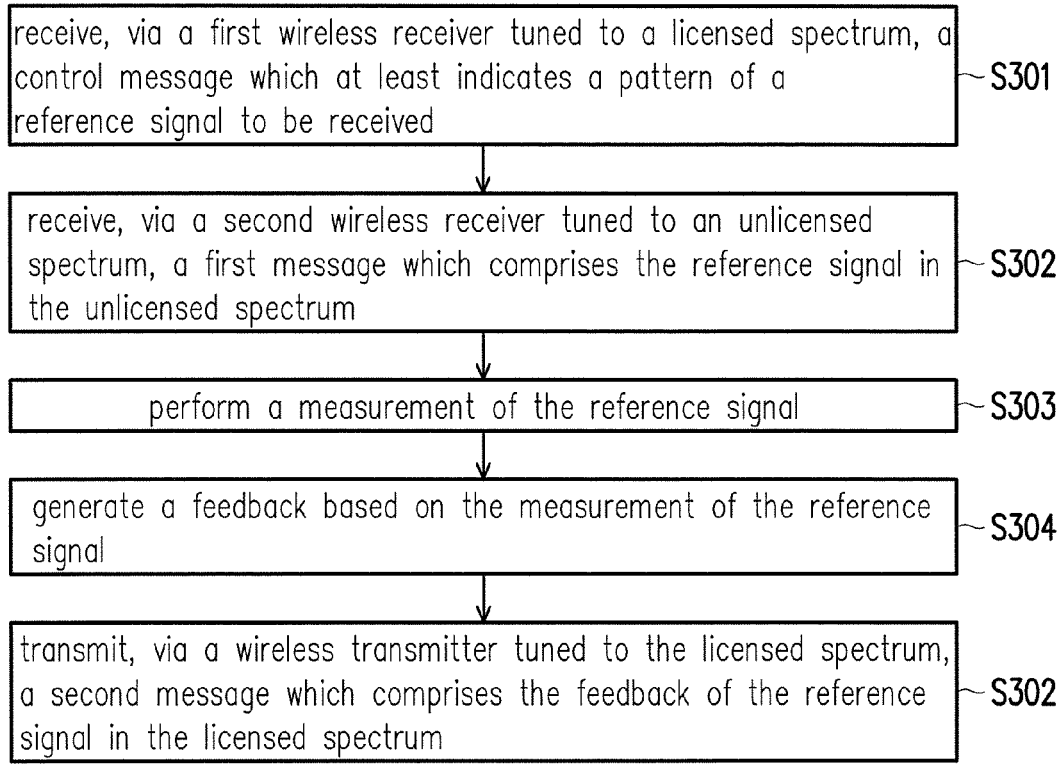
FIG. 3 is a flow chart which illustrates the proposed method of transmitting a reference signal used by a wireless device in an unlicensed spectrum for a LTE-LAA communication system of the disclosure.

FIG. 3 is a flow chart which illustrates the proposed method of transmitting a reference signal used by a wireless device in an unlicensed spectrum for a LTE-LAA communication system of the disclosure. In step S301, the wireless device may receive, via a first wireless receiver tuned to a licensed spectrum, a control message which indicates not limited to a pattern of a reference signal to be received. In step S302, the wireless device may receive, via a second wireless receiver tuned an unlicensed spectrum, a first message which comprises the reference signal in the unlicensed spectrum. In step S303, the wireless device may perform a measurement of the reference signal. In step S304, the wireless device may generate a feedback based on the measurement of the reference signal. In step S305, the wireless device may transmit, via a wireless transmitter tuned to the licensed spectrum, a second message which comprises the feedback of the reference signal in the licensed spectrum.

The above mentioned reference signal could be a part of a first cluster reference signals which may include at least two or three consecutive transmissions of identical reference signals.

The above mentioned control message may include not limited to one of a cancellation message, a deference message, a configuration message, and a transmission status report.

In one of the exemplary embodiments, the control message includes not limited to a cancellation message to cancel a second cluster of reference signal. In addition, the cancellation message could also indicates a number of clusters of reference signals to be cancelled.

In one of the exemplary embodiments, the control message includes not limited to a deference message for deferring the receiving of the reference signal. In addition, the deference message could further indicate a duration of the deferring the receiving of the reference signal.

In one of the exemplary embodiments, the control message includes not limited to a transmission status report which includes a bitmap that indicates at least a first reference signal of the first cluster of reference signals to be received and at least a second reference signal of the first cluster of reference signals to be cancelled. In other words, the bitmap would indicate for a specific cluster that certain reference signal(s) is to be received and/or certain reference signal(s) is not to be received.

Alternatively, the control message includes at least a transmission status report which includes a number consecutive of reference signals within the first cluster or another cluster to be cancelled.

In one of the exemplary embodiments, the transmission status report could aggregate multiple reports in response to be the unlicensed spectrum being unavailable for a previous transmission.

In one of the exemplar embodiments, the control signal is received from a primary serving cell ($P_{Cell}$), and the reference signal is received from a secondary serving cell (Scell).

The above mentioned control message could be decoded from a physical layer control channel (PDCCH). From the PDCCH, a new RNTI could be found, and the new RNTI may identify that the control message is intended for a group of LAA wireless devices.

The above mentioned the control message could be at least one of a primary synchronization signal (PSS), a secondary synchronization signal (SSS), a cell specific reference signal (CRS), a channel state information-reference signal (CSI-RS), a discovery reference signal (DRS), other new reference signals designed for LAA, other new reference signals for 5G cellular operation in unlicensed band, and so forth.

In one of the exemplary embodiments, there could be a time gap between consecutive reference signal transmissions in a cluster. The duration of the time gap could be greater than zero or could actually be zero. The duration of an entire cluster could be greater than access times of all devices currently using the unlicensed spectrum but is less than the limit set by the regional government regulatory agency.

In one of the exemplary embodiments, the duration between two clusters could be configured by the control message which may indicate a number of consecutive transmissions per cluster.

In one of the exemplary embodiments, the control message could configures the time duration between a start of a reference signal and a start of a next repeated reference signal. Alternatively, the control message could also configures a second time duration between an end of a reference signal and a start of a next repeated reference signal.

One, some, or all of the above mentioned time durations could be indicated by at least one of an absolute time, a number of subframes, a number of frames, a number of physical layer time slots, and a number of OFDM symbols.

To further elucidate the aforementioned method of transmitting a reference signal used by a wireless device in an unlicensed spectrum for a LTE-LAA communication system, and a wireless device using the same method, the disclosure will provides exemplary embodiments as follows.

FIG. 4 illustrates transmitting a reference signal used by a wireless device in an unlicensed spectrum for a LTE-LAA communication system in accordance with one of the exemplary embodiments of the disclosure. According to FIG. 4, repeating reference signals are transmitted in three consecutive 605 transmission opportunities in one cluster. However, the disclosure does not limit to three reference signals but the repeating reference signals could be any number of two or more. Between reference signals, there could be a small time gap between transmission opportunities, and the small time gap could be zero. If the small time gap is zero, this means that a next reference signals is transmitted as soon as possible. In the case of frequency domain duplexing (FDD), this would mean that a next reference signal is transmitted by a base station in the next available subframe. In the case of time domain duplexing (TDD), this would mean that a next reference signal is transmitted by a base station in the next available downlink subframe.

In general, the number of consecutive reference signal transmissions or the total transmission duration of a cluster of reference signals, such as $T_{00}$ in FIG. 4, might be set according to the restriction of the time duration of unlicensed band access. The number of consecutive reference signal transmissions or the total transmission duration of a cluster of reference signals might be configured so that the length, such as $T_{00}$ in FIG. 4, is long enough to ensure that other unlicensed band access time will be shorter than the total transmission time of reference signals. As a result, a wireless receiver would have a decent chance to at least receive a reference signal assuming that other unlicensed band radios have already finished transmissions.

For example, the total transmission duration of a cluster of reference signals $T_{00}$ such as the one shown in FIG. 4 might be set according to the maximum unlicensed band access time. The maximum unlicensed band access time could be set by a government regulation agency. The maximum unlicensed band access time could also depend on a wireless radio access technology other than the LAA, such as the maximum TXOP value in Wi-Fi. The maximum unlicensed band access time may be set by a 3GPP LAA standard.

In general, a base station may transmit a control signaling messages to one or a group of wireless devices that are expected to receive reference signals in the unlicensed band. For example, a control signaling message could be sent to a set of LAA-enabled wireless devices. The control signaling message would normally be transmitted in the licensed band such as the regular LTE control plane in licensed band $P_{Cell}$. A control signaling message might be transmitted via a physical layer control channel in licensed band such as a PDCCH. The PDCCH may contain a new RNTI which could be used to identify the target audience of a control signaling message. The target audience could be one or a group of LAA wireless devices. The control signaling message may include not limited to one of a reference signal configuration message, a reference signal cancellation message, a reference signal deferring message, and a reference signal transmission status report message.

FIG. 5 illustrates transmitting a reference signal configuration message to configure a transmission of a reference signal used by a wireless device in an unlicensed spectrum for a LTE-LAA communication system in accordance with one of the exemplary embodiments of the disclosure. In more detail, a base station may transmit a control message which would include a configuration message to configure patterns of reference signals to be transmitted by a base station. By receiving the configuration message, one or a group of wireless devices may know whether receiving reference signals in the unlicensed spectrum is expected and how to receive reference signals in unlicensed spectrum. A control messages could be transmitted from a primary serving cell ($P_{Cell}$) which would use a licensed band to transmit LTE signals. Reference signals in an unlicensed spectrum could be transmitted from a secondary serving cell ($S_{Cell}$).

The overall network (e.g. 100) may include a control entity (e.g. 104) to associate the licensed band $P_{Cell}$ control signaling transmission and the unlicensed band $S_{Cell}$ transmission.

In the scenario FIG. 5, a wireless device would receive a configuration 501 from a base station in a licensed spectrum 502 to configure reference signals in an unlicensed spectrum 503. The configuration message 501 could be a part of a control message decoded from a PDCCH. The configuration message 501 may include a time duration, T31, between one cluster of repeated reference signals to the next cluster of repeated reference signals. The configuration message 501 may also include the number of repeated reference signals, N34, per cluster such as 3 in this example. The configuration message 501 may further include the time duration, T32, between the starting time of one reference signal to the starting time of the next repeated reference signal. The configuration message 501 may further include the time duration, T33, between the end time of one reference signal to the starting time of the next repeated reference signal.

The aforementioned time duration values could be indicated in unit of absolute time in terms of seconds(milliseconds, microseconds, and etc), number of subframes, the number of frames number of time slots such as the physical layer time slots), number of OFDM symbols, and so forth.

Figure 6:
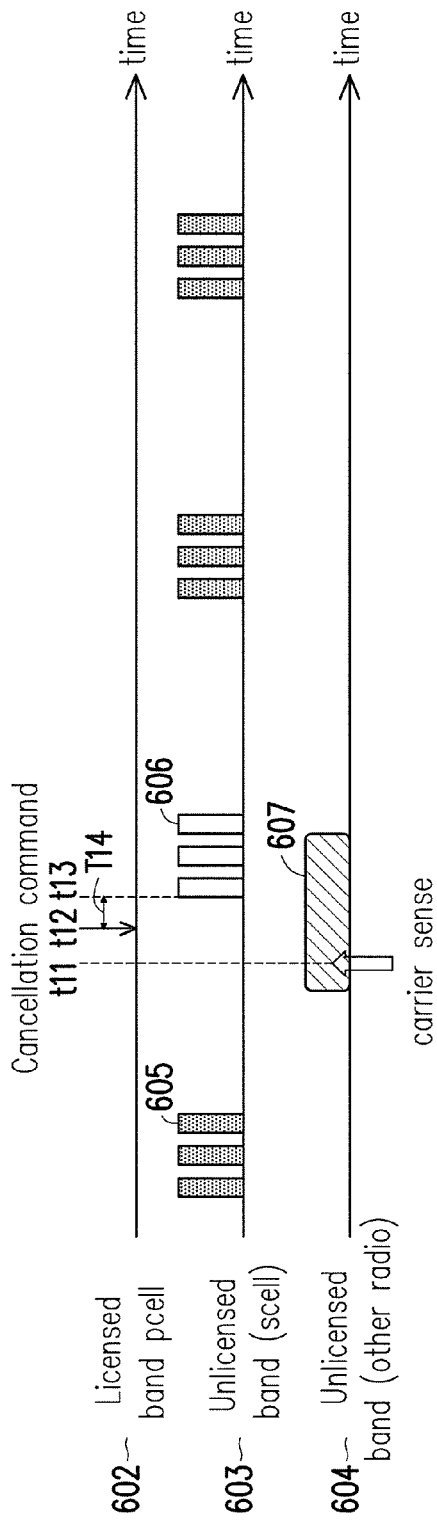
FIG. 6 illustrates a cancellation command to cancel a transmission of a reference signal used by a wireless device in an unlicensed spectrum for a LTE-LAA communication system in accordance with one of the exemplary embodiments of the disclosure.

FIG. 6 illustrates a cancellation command transmitted in a licensed spectrum 602 to cancel a transmission of a reference signal in an unlicensed spectrum 603 used by a wireless device for a LTE-LAA communication system in accordance with one of the exemplary embodiments of the disclosure. In the exemplary embodiment of FIG. 6, reference signals the actual transmission of reference signals would depend on the availability of the unlicensed band. If the unlicensed spectrum is not available, a base station may transmit a cancellation command to indicate that a specific cluster of reference signals is to be cancelled. One cancellation command could be used to cancel one cluster of reference signal transmissions or multiple clusters of reference signal transmissions by indicating the exact number of reference signals to be cancelled.

In FIG. 6 a base station may conduct carrier sensing 608 or a clear channel assessment in the unlicensed band 604 at time $t_{11}$. The unlicensed band 604 could be identical to over overlaps with the unlicensed band 603 of the Scell. Assuming that after a first cluster 605 has been transmitted, at time $t_{12}$, the base station transmits a cancellation command to cancel a second cluster 606 in response to the carrier sensing which indicates that the unlicensed band is currently busy for a specific period 607 and is unavailable for use by the LTE-U operation. The cancellation command would be transmitted in the licensed band PCell to wireless devices to indicate the cancellation of the planned reference signals in unlicensed SCell starting from $t_{13}$. The effective cancellation of $t_{13}$ would have a duration of $T_{14}$ which is after the planned reference signal starting time $t_{13}$. The time duration $T_{14}$ would be configured to be long enough to account for the delay in implementation such that a wireless device would have the necessary time to react to the cancellation command in order to avoid receiving in the unlicensed band.

Figure 7:
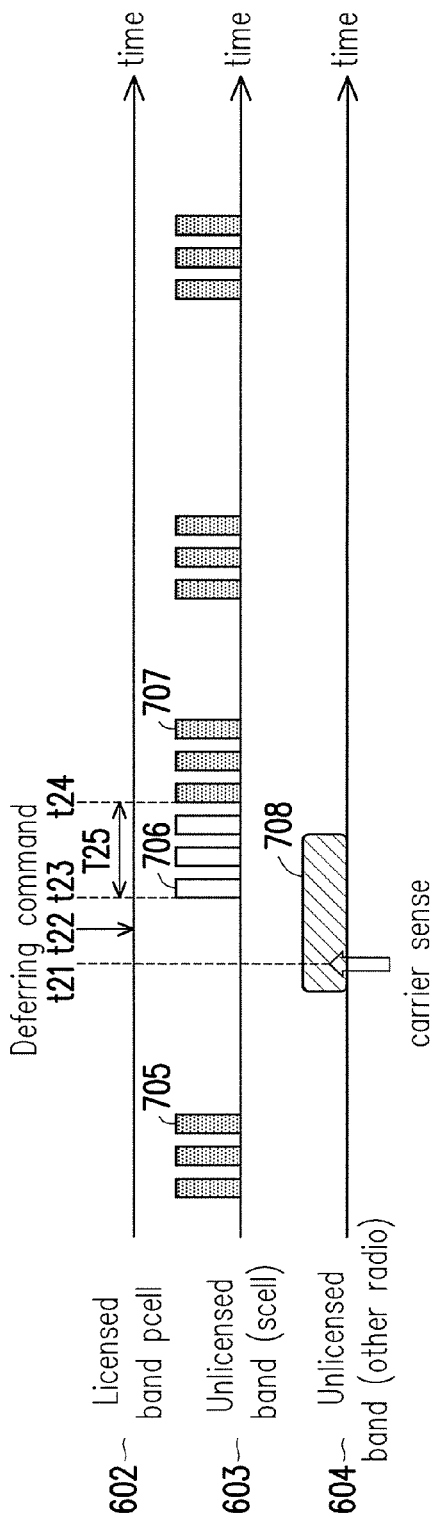
FIG. 7 illustrates a deferring command to defer a transmission of a reference signal used by a wireless device in an unlicensed spectrum for a LTE-LAA communication system in accordance with one of the exemplary embodiments of the disclosure.

FIG. 7 illustrates a deferring command to defer a transmission of a cluster of reference signals used by a wireless device in an unlicensed spectrum for a LTE-LAA communication system in accordance with one of the exemplary embodiments of the disclosure. Similar to the scenario of FIG. 6, the actual transmission of reference signals would depend on the availability of the unlicensed band. The deterring command would defer one cluster of reference signals or multiple clusters of deference signals. The deterring command may further include information of the number of clusters to be deferred as well as a time duration or multiple time durations of deference of reference signals. The time duration could be indicated in terms of a unit of seconds, milliseconds, or microseconds. The number of clusters to be deferred would depend on a result of carrier sensing or clear channel assessment results in unlicensed band.

For example, the duration of sensed busy period and/or the maximum allowable transmission duration in the unlicensed band might be used to set the deferring value. The base station could defer the reference signal transmission as the result of busy traffic in the unlicensed band. In FIG. 7, a base station may conduct carrier sensing or clear channel assessment in the unlicensed band at time $t_{21}$. In response to the carrier sensing, at time $t_{22}$, the base station transmit a cancellation command because the unlicensed band is currently unavailable for a specific period 708. The cancellation command could be transmitted in the licensed band $P_{Cell}$ to wireless devices to indicate that the deferring of the planned reference signals starting from $t_{23}$. That cluster of reference signals which would have been transmitted at $t_{23}$ would be deferred to a later time.

In FIG. 7, the deferring command may provide a deferring duration such as T25 as an example in FIG. 7. Alternative, the duration may also be implicit and pre-arranged between the base station and wireless devices attached to the base station. The deferring duration could be provided in terms of the number of consecutive reference signals in a cluster to be transmitted. For FIG. 7, the deferring duration T25 is set to be 3 individual reference signal transmissions as an example. Thus, a value of 3 could be included in the deferring command indicate the deferring duration. The starting time of a cluster of reference signals which has been deferred could further be included in the deferring command. For the scenario of FIG. 7, $t_{24}$ is the starting time of the cluster of reference signals which has been deferred as an example. In FIG. 7, after a first cluster of reference signals 705 has been transmitted, at time $t_{21}$ upon sensing that the unlicensed spectrum is unavailable for a specific duration, the base station in time $t_{22}$ sends a deferring commend to defer a cluster of reference signals which would have started in time $t_{23}$ to time $t_{24}$ instead. The duration of deference is 3 reference signals in this scenario.

The aforementioned control message transmitted in the licensed band PCell could also be used to report the transmission status of reference signals. In general, the report of transmission status of reference signal could be used such that a planned individual reference signal transmission would be actually transmitted if the unlicensed band is available for transmission; whereas a planned individual reference signal transmission might not be actually transmitted if the unlicensed band is unavailable for transmission.

The transmission time could be indicate after a cluster of planned reference signal transmission has been transmitted. If the transmission of an individual reference signal or a cluster has been delayed, the transmission status report may include aggregated transmission report. A transmission status report could be transmitted to configure every cluster of repeated reference signal transmission opportunities. The transmission status report may also explicitly indicate whether the scheduled reference signals are actually transmitted or not.

In one of the exemplary embodiment, a transmission status report may include a bitmap which indicates whether individual reference signals or individual reference signals in a cluster are transmitted or not. For example, assuming that a bitmap contains a binary bit sequence of 001111 to indicate that the $1^{st}$ reference signal and the $2^{nd}$ reference signal are not transmitted meanwhile the $3^{rd}$, $4^{th}$, $5^{th}$, and $6^{th}$ reference signals are transmitted.

In one of the exemplary embodiments, a number of sequentially non-transmitted reference signals could be included. For example, an information element "N_non_transmit" in the transmission status report might be set to 2. In such case, the $1^{st}$ and the $2^{nd}$ reference signals are not transmitted, but mean while the $3^{rd}$, $4^{th}$, $5^{th}$, and $6^{th}$ reference signals would be transmitted.

In one of the exemplary embodiments, a transmission status report may include a binary indicator to indicate that all the reference signals in a cluster are to be transmitted.

Similarly, a transmission status report may have a binary indicator to indicate that at least one of the reference signals is not transmitted.

Upon receiving a transmission status report, a wireless device might adjust its channel measurement results based on the transmission status report. For example, the channel quality measurement would only calculated the measured channel quality results that corresponds to the individual reference signals which actually have transmitted. A wireless device may report to the base station the adjusted channel measurement results in response to receiving a transmission status report.

Figure 8:
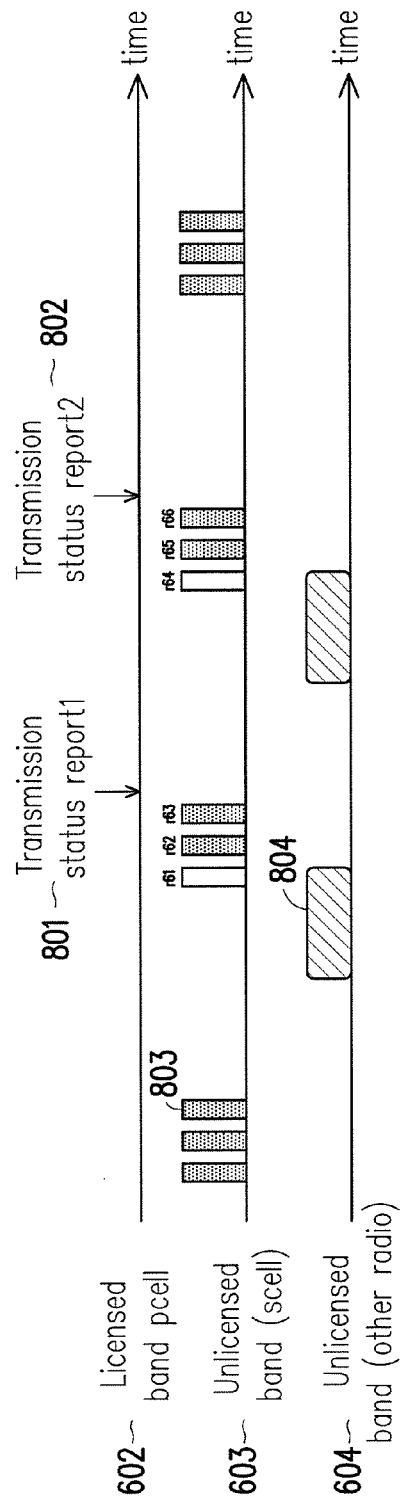
FIG. 8 illustrates transmitting a status report by a wireless device in an unlicensed spectrum for a LTE-LAA communication system in accordance with one of the exemplary embodiments of the disclosure.

FIG. 8 illustrates transmitting a status report by a wireless device in an unlicensed spectrum for a LTE-LAA communication system in accordance with one of the exemplary embodiments of the disclosure. In the exemplary embodiment of FIG. 8, after successfully transmitting a first cluster of reference signals 803, upon detecting that the unlicensed band 604 is unavailable for a specific duration 804 after performing carrier sensing or clear channel assessment, the base station may transmit a first transmission status report 801. The first transmission status report would indicate that the reference signal $r_{61}$ is not transmitted while the reference signal $r_{62}$ and the reference signal $r_{63}$ are transmitted. Similarly, a second transmission report could be transmitted to indicate that the reference signal $r_{64}$ is not transmitted while the reference signal $r_{65}$ and the reference signal $r_{66}$ are transmitted. Furthermore, the first transmission status report 801 may include a command to request the wireless device to provide a feedback of the measurement results which is in response to the wireless device receiving the reference signal 803 from a base station.

Figure 9:
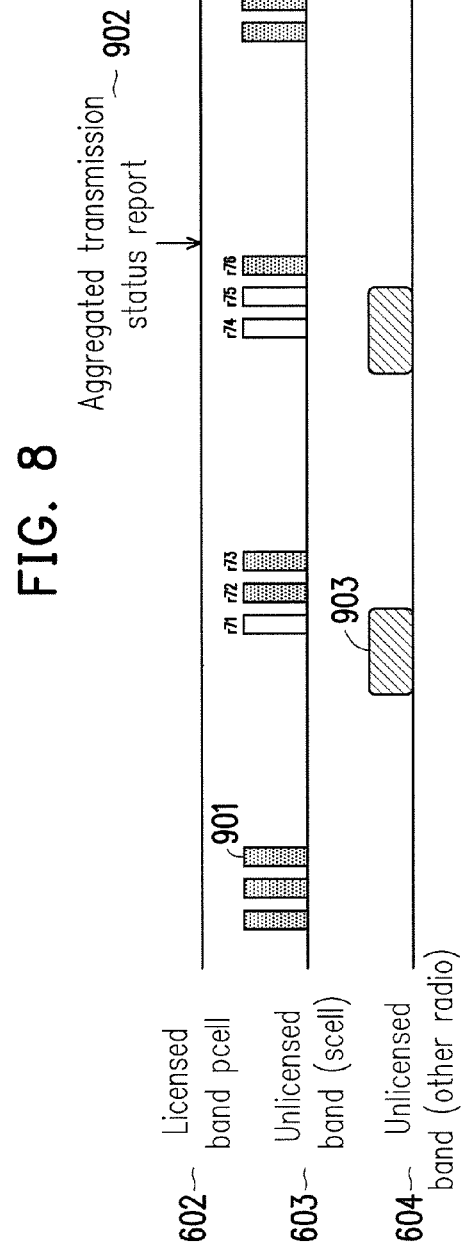
FIG. 9 illustrates transmitting an aggregated transmission status report by a wireless device in an unlicensed spectrum for a LTE-LAA communication system in accordance with one of the exemplary embodiments of the disclosure.

FIG. 9 illustrates transmitting an aggregated transmission status report by a wireless device in an unlicensed spectrum for a LTE-LAA communication system in accordance with one of the exemplary embodiments of the disclosure. In the exemplary embodiment of FIG. 9, after successfully transmitting a first cluster of reference signals 901, upon detecting that the unlicensed band 604 is unavailable for a specific duration 903 after performing carrier sensing or clear channel assessment, the base station may transmit an aggregated transmission status report 901. The aggregated transmission status report 901 would indicate that the reference signals $r_{71}$, $r_{74}$, and $r_{75}$ are not transmitted while the reference signals $r_{72}$, $r_{73}$, and $r_{76}$ transmitted. Moreover, the transmission report may include a command by the base station to request a wireless device to provide a feedback of the measurement results which is in response to transmitting to the wireless device the reference signal 901.

Figure 10:
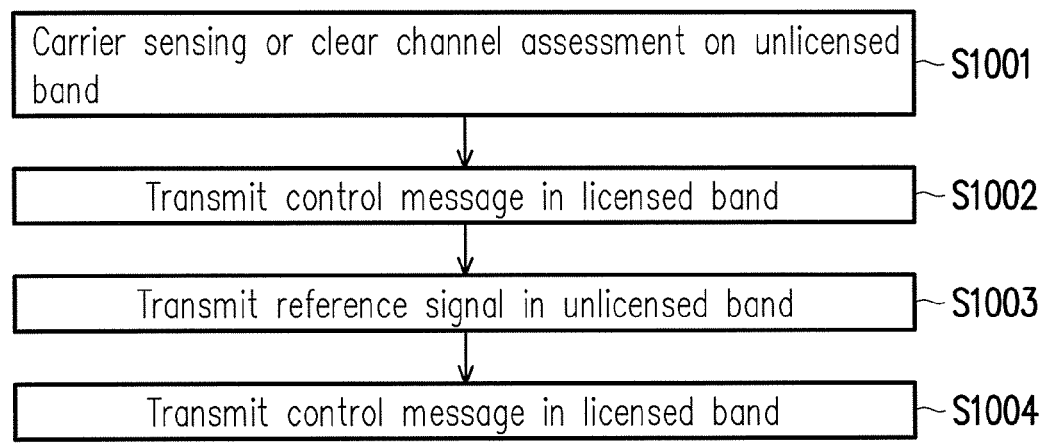
FIG. 10 is a flow chart which illustrates a base station transmitting a reference signal in accordance with one of the exemplary embodiments of the disclosure.

FIG. 10 is a flow chart which illustrates the proposed method of transmitting a reference signal from the perspective of a base station in accordance with one of the exemplary embodiments of the disclosure. It should be noted that the concept behind FIG. 10 is similar to FIG. 2~FIG. 9 and its corresponding written descriptions except that the disclosure is from the perspective of a base station (as opposed to from the perspective of a wireless device as in FIG. 3). Also the actual implementation steps S1002 and S1003 could be impossible and thus could be skipped if the step S1001 returns a busy result or if the base station never intends on using the unlicensed spectrum. In step S1001, the base station would perform a carrier sense or a clear channel assessment to determine the traffic status of the unlicensed band. In step S1002, a base station may transmit a first control message in the licensed band, and the first control message may include not limited to one of a configuration message to configure a cluster of reference signals instead of one reference signal, a cancellation message to cancel an entire cluster of reference signals, a deference message to defer an entire cluster of reference signals, and a transmission status report. In step S1003, the base station would transmit a reference signal in an unlicensed band, and the pattern of the reference signal is indicated in the control message back in step S1002. In step S1004, the base station may transmit a second control message in the licensed band.

For example, a configuration message could be sent in step S1002, and a cancellation message could be sent in step S1004. Or alternatively, a cancellation message might be sent in step S1002, and a deferring message could be sent in step S1004. Alternatively, a transmission status report message could be sent in either step S1002 or step S1004 such that the number of transmitted reference signals could be set to be 0 if the unlicensed channel is currently occupied by another radio or 1 or several if a cluster of repeated reference signals is to be transmitted. The detailed descriptions of these steps are coherent with the disclosure of FIG. 2~FIG. 9 and thus a repetition would not be deemed necessary.

In view of the aforementioned descriptions, the present disclosure is suitable for being used in a wireless communication system and is able to configure the pattern of reference signals to be transmitted in the unlicensed spectrum to enhance the reception of reference signals in the unlicensed spectrum by wireless devices operating under LTE-LAA and to avoid conflict with other radios that are also using the same unlicensed spectrum.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of transmitting a reference signal used by a wireless device in an unlicensed spectrum for a Long Term Evolution (LTE) Licensed Assisted Access (LAA) communication system, the method comprising:
   receiving, via a first wireless receiver tuned to a licensed spectrum, a control message which at least indicates a pattern of a reference signal to be received;
   receiving, via a second wireless receiver tuned to an unlicensed spectrum, a first message which comprises the reference signal in the unlicensed spectrum;
   performing a measurement of the reference signal;
   generating a feedback based on the measurement of the reference signal; and transmitting, via a wireless transmitter tuned to the licensed spectrum, a second message which comprises the feedback of the reference signal in the licensed spectrum.

2. The method of claim 1, wherein the reference signal is a part of a first cluster of at least three consecutive transmissions of identical reference signals.

3. The method of claim 1, wherein the control message includes at least a cancellation message to cancel a second cluster of reference signal.

4. The method of claim 3, wherein the cancellation message further indicates a number of clusters of reference signals to be cancelled.

5. The method of claim 1, wherein the control message includes at least a deference message for deferring the receiving of the reference signal.

6. The method of claim 5, wherein the deference message further indicates a duration of the deferring the receiving of the reference signal.

7. The method of claim 2, wherein the control message includes at least a transmission status report which includes a bitmap that indicates at least a first reference signal of the first cluster of reference signals to be received and at least a second reference signal of the first cluster of reference signals to be cancelled.

8. The method of claim 2, wherein the control message includes at least a transmission status report which includes a number of reference signals of the first cluster to be cancelled.

9. The method of claim 8, wherein the transmission status report aggregates multiple reports in response to be the unlicensed spectrum being unavailable for a previous transmission.

10. The method of claim 1, wherein the control signal is received from a primary serving cell (Pcell), and the reference signal is received from a secondary serving cell (Scell).

11. The method of claim 1, wherein the control message is decoded from a physical layer control channel (PDCCH) within which a new RNTI is used to identify the control message for a group of LAA wireless devices.

12. The method of claim 1, wherein the control message is at least one of a primary synchronization signal (PSS), a secondary synchronization signal (SSS), a cell specific reference signal (CRS), a channel state information-reference signal (CSI-RS), a discovery reference signal (DRS).

13. The method of claim 12, wherein there is a time gap between consecutive transmissions, wherein the time gap is greater or equal to zero.

14. The method of claim 13, wherein a duration of the cluster is greater than access times of all other devices in the unlicensed spectrum but is less than the limit set by the regional government regulatory agency.

15. The method of claim 14, wherein the duration between the cluster and a next cluster is configured by the control message.

16. The method of claim 13, wherein the control message configures a number of consecutive transmissions of the cluster.

17. The method of claim 13, wherein the control message configures a first time duration between a start of a reference signal and a start of a next repeated reference signal.

18. The method of claim 17, wherein the control message configures a second time duration between an end of a reference signal and a start of a next repeated reference signal.

19. The method of claim 18, wherein the first time duration and the second time duration is configured by at least one of an absolute time, a number of subframes, a number of frames, a number of physical layer time slots, and a number of OFDM symbols.

20. A wireless device comprising:
a first wireless receiver tuned to a licensed spectrum;
a second wireless receiver tuned to an unlicensed spectrum;
a wireless transmitter tuned to the licensed spectrum; and
a processor coupled to the first wireless receiver, the second wireless receiver, and the wireless transmitter, wherein the processor is configured at least for:
receiving, via a first wireless receiver tuned to a licensed spectrum, a control message which at least indicates a pattern of a reference signal to be received;
receiving, via a second wireless receiver tuned to an unlicensed spectrum, a first message which comprises the reference signal in the unlicensed spectrum;
performing a measurement of the reference signal;
generating a feedback based on the measurement of the reference signal; and
transmitting, via a wireless transmitter tuned to the licensed spectrum, a second message which comprises the feedback of the reference signal in the licensed spectrum.

* * * * *